(12) United States Patent
Tang et al.

(10) Patent No.: US 11,006,458 B2
(45) Date of Patent: May 11, 2021

(54) RANDOM ACCESS METHOD AND DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 69 days.

(21) Appl. No.: 16/467,878

(22) PCT Filed: Dec. 8, 2016

(86) PCT No.: PCT/CN2016/109080
§ 371 (c)(1),
(2) Date: Jun. 7, 2019

(87) PCT Pub. No.: WO2018/103050
PCT Pub. Date: Jun. 14, 2018

(65) Prior Publication Data
US 2020/0077445 A1     Mar. 5, 2020

(51) Int. Cl.
*H04W 74/08*     (2009.01)
*H04W 72/04*     (2009.01)

(52) U.S. Cl.
CPC ..... *H04W 74/0833* (2013.01); *H04W 72/044* (2013.01)

(58) Field of Classification Search
CPC .................. H04W 74/0833; H04W 72/044
See application file for complete search history.

(56) References Cited

U.S. PATENT DOCUMENTS

2012/0207040 A1* 8/2012 Comsa .............. H04W 72/1215
                                                    370/252
2014/0376466 A1  12/2014 Jeong et al.
(Continued)

FOREIGN PATENT DOCUMENTS

CN     101529754     9/2009
CN     103313419     9/2013
(Continued)

OTHER PUBLICATIONS

SIPO, First Office Action for CN Application No. 201680091195.2, dated May 28, 2020.
(Continued)

*Primary Examiner* — Zhiren Qin
(74) *Attorney, Agent, or Firm* — Hodgson Russ LLP

(57) ABSTRACT

The present application provides a method and device for random access. The method includes: receiving, via a terminal device, N groups of random access-related information sent by a network device, wherein the N groups of random access-related information are determined by the network device according to a network deployment and optimization policy, and the $i^{th}$ group of random access-related information is used by the terminal device for determining a random access preamble set i and a time-frequency resource corresponding to the random access preamble set i, N being a positive integer greater than or equal to 1, i=1, . . . N; and sending, via the terminal device, a random access preamble to the network device according to the N groups of random access-related information.

16 Claims, 4 Drawing Sheets

100

Terminal device receives N groups of random access-related information sent by a network device, wherein the N groups of random access-related information are determined by the network device according to a network deployment and optimization policy, and the $i^{th}$ group of random access-related information is used by the terminal device for determining a random access preamble set *i* and a time-frequency resource corresponding to the random access preamble set *i*, N being a positive integer greater than or equal to 1, i=1, . . . N — S110

The terminal device sends a random access preamble to the network device according to the N groups of random access-related information — S120

(56) References Cited

U.S. PATENT DOCUMENTS

2016/0014792 A1   1/2016  Jeong et al.
2016/0219622 A1*  7/2016  Liu ...................... H04W 76/10
2016/0295609 A1*  10/2016  Vajapeyam ....... H04W 74/0833
2018/0070380 A1*  3/2018  Nagaraja .............. H04B 7/0695
2018/0310344 A1*  10/2018  Zhou .................... H04W 74/08

FOREIGN PATENT DOCUMENTS

CN       105379336      3/2016
WO      2016099138      6/2016

OTHER PUBLICATIONS

WIPO, ISR for PCT/CN2016/109080, dated Aug. 25, 2017.
IPI, Office Action for IN Application No. 201917026206, dated Aug. 26, 2020.
EPO, Office Action for EP Application No. 16923270.9, dated Oct. 10, 2019.
JPO, Office Action for JP Application No. 2019-530045, dated Dec. 15, 2020.
Zte et al., "Unified RACH procedure," 3GPP TSG RAN WG1 Meeting #87, R1-1611273, Nov. 2016, 9 pages.
TIPO, Office Action for TW Application No. 106141458, dated Mar. 18, 2021.

* cited by examiner

RANDOM ACCESS METHOD AND DEVICE

CROSS-REFERENCE TO RELATED APPLICATION

This application is a U.S. national phase application of International Application No. PCT/CN2016/109080, filed Dec. 8, 2016, the entire disclosure of which is incorporated herein by reference.

TECHNICAL FIELD

Embodiments of the present application relate to the field of communications, and more particularly, to a method and device for random access.

BACKGROUND

In the random access procedure in the Long Term Evolution (LTE) system, the user equipment (User Equipment, referred to as "UE") generates a corresponding preamble (Preamble) at a corresponding time-frequency location according to a random access parameter of the network, and then waits for a response of the network. If the UE can detect its own Random Access Response (RAR) in a specified time window, it enters the next step of the random access procedure; and if the UE does not detect its corresponding RAR, then it sends the Preamble again according to a specified time sequence and method.

Different from the LTE system using one beam (Beam) to cover one cell, in future communication systems, it is common to implement coverage of one cell by using time sweeping (Sweeping) by a plurality of Beams. This communication system may be called as "multi-beam system". In the multi-beam system, the UE may use different Beams for information transmission and reception. Therefore, it is necessary to provide a random access method suitable for the multi-beam system.

SUMMARY

The present application provides a method and device for random access that can be applied to a multi-beam communication system.

In a first aspect, there is provided a method for random access, including: receiving, via a terminal device, N groups of random access-related information sent by a network device, wherein the N groups of random access-related information are determined by the network device according to a network deployment and optimization policy, and the $i^{th}$ group of random access-related information is used by the terminal device for determining a random access preamble set i and a time-frequency resource corresponding to the random access preamble set i, N being a positive integer greater than or equal to 1, i=1, ... N; and sending, via the terminal device, a random access preamble to the network device according to the N groups of random access-related information.

According to the method for random access of the present application, the terminal device receives the random access-related information sent by the network device according to the network deployment and optimization policy, and sends the random access preamble to the network device according to the received random access-related information; therefore, the method can be applied to multi-beam communication system.

In combination with the first aspect, in an implementation manner of the first aspect, the sending, via the terminal device, the random access preamble to the network device according to the N groups of random access-related information, includes: determining, via the terminal device, K random access preamble sets according to K groups of random access-related information in the N groups of random access-related information, wherein K is a positive integer greater than or equal to 2; determining, via the terminal device, K random access preambles according to the K random access preamble sets, wherein the random access preamble sets to which the K random access preambles belong are different from each other; determining, via the terminal device, time-frequency resources corresponding to the K random access preambles according to the K groups of random access-related information; and sending, via the terminal device, the K random access preambles to the network device on the time-frequency resources corresponding to the K random access preambles, wherein transmitting beams corresponding to at least two of the K random access preambles are different.

Therefore, the terminal device sends a plurality of random access preambles to the network device by using different beams, so that the terminal device can determine the random access preamble correctly received by the network device according to the random access response sent by the network device for the plurality of random access preambles, and then the beam used for communication with the network device can be determined, the blind transmission of the terminal device can be reduced by using different beams, and the delay of the random access procedure can be reduced.

In combination with the first aspect and its implementation manner mentioned above, in another implementation manner of the first aspect, the $i^{th}$ group of random access-related information includes: preamble information i and resource indication information i, the preamble information i is used to indicate a parameter for determining the random access preamble set i, and the resource indication information i is used to indicate a time-frequency resource corresponding to the random access preamble set i.

In combination with the first aspect and its implementation manners mentioned above, in another implementation manner of the first aspect, the first group of random access-related information includes: preamble information 1 and resource indication information 1, the $j^{th}$ group of random access-related information includes: offset information j, and the offset information j is used by the terminal device for determining preamble information j and resource indication information j according to the offset information j, j=2, ... N;

wherein the preamble information 1 is used to indicate a parameter for determining a random access preamble set 1, the resource indication information 1 is used to indicate a time-frequency resource corresponding to the random access preamble set 1, the preamble information j is used to indicate a parameter for determining a random access preamble set j, and the resource indication information j is used to indicate a time-frequency resource corresponding to the random access preamble set j.

In combination with the first aspect and its implementation manners mentioned above, in another implementation manner of the first aspect, the offset information j includes at least one of following information: root sequence number offset information, frequency domain resource offset information and time domain resource offset information.

In combination with the first aspect and its implementation manners mentioned above, in another implementation manner of the first aspect, the method further includes: starting to detect, via the terminal device, a random access response according to a Random Access Radio Network Temporary Identifier (RA-RNTI) corresponding to each random access preamble in T random access preambles at a start time of a preset time window, wherein the T random access preambles are random access preambles sent by the terminal device to the network device before the current detection time, and T is a positive integer less than or equal to K; and determining, via the terminal device, a transmitting beam corresponding to the random access preamble which is correctly received by the network device in the T random access preambles, according to the detected valid random access response.

In combination with the first aspect and its implementation manners mentioned above, in another implementation manner of the first aspect, the method further includes: when the terminal device detects a preset number of the valid random access responses before an end time of the preset time window, stopping, via the terminal device, the detection.

In combination with the first aspect and its implementation manners mentioned above, in another implementation manner of the first aspect, the method further includes: stopping, via the terminal device, the detection at an end time of the preset time window; and when the terminal device determines that no valid random access response is detected within the preset time window, resending, via the terminal device, the random access preamble to the network device according to the N groups of random access-related information.

In combination with the first aspect and its implementation manners mentioned above, in another implementation manner of the first aspect, the method further includes: performing, via the terminal device, information transmission with the network device according to the transmitting beam corresponding to the random access preamble which is correctly received by the network device.

According to a second aspect, there is provided a method for random access, including: determining, via a network device, N groups of random access-related information according to a network deployment and optimization policy, wherein the $i^{th}$ group of random access-related information is used by a terminal device to determine a random access preamble set i and a time-frequency resource corresponding to the random access preamble set i, N being a positive integer greater than or equal to 1, i=1, . . . N; sending, via the network device, the N groups of random access-related information to the terminal device; and receiving, via the network device, a random access preamble sent by the terminal device according to the N groups of random access-related information.

According to the method for random access of the present application, the network device sends the random access-related information to the terminal device according to the network deployment and optimization policy, such that the terminal device can send the random access preamble to the network device according to the received random access-related information; therefore, the method can be applied to the multi-beam communication system.

In combination with the second aspect, in an implementation manner of the second aspect, the network device receives the random access preamble sent by the terminal device according to the N groups of random access-related information, includes: receiving, via the network device, K random access preambles that are sent by the terminal device on the time-frequency resources corresponding to the K random access preambles, wherein transmitting beams corresponding to at least two of the K random access preambles are different; wherein the K random access preambles are determined by the terminal device according to the K random access preamble sets, the random access preamble sets to which the K random access preambles belong are different from each other, and the time-frequency resources corresponding to the K random access preamble sets and the K random access preambles are determined by the terminal device according to the K groups of random access-related information in the N groups of random access-related information, wherein K is a positive integer greater than or equal to 2.

In combination with the second aspect and its implementation manner mentioned above, in another implementation manner of the second aspect, the $i^{th}$ random access-related information i includes preamble information i and resource indication information i, the preamble information i is used to indicate a parameter for determining a random access preamble set i, and the resource indication information i is used to indicate a time-frequency resource corresponding to the random access preamble set i.

In combination with the second aspect and its implementation manner mentioned above, in another implementation manner of the second aspect, the first group of random access-related information includes preamble information 1 and resource indication information 1, the $j^{th}$ group of random access-related information includes offset information j, and the offset information j is used by the terminal device to determine the preamble information j and the resource indication information j according to the offset information j, j=2, . . . N;

wherein the preamble information 1 is used to indicate a parameter for determining a random access preamble set 1, the resource indication information 1 is used to indicate a time-frequency resource corresponding to the random access preamble set 1, the preamble information j is used to indicate a parameter for determining the random access preamble set j, and the resource indication information j is used to indicate a time-frequency resource corresponding to the random access preamble set j.

In combination with the second aspect and its implementation manners mentioned above, in another implementation manner of the second aspect, the offset information j includes at least one of following information: root sequence number offset information, frequency domain resource offset information, and time domain resource offset information.

In combination with the second aspect and its implementation manners mentioned above, in another implementation manner of the second aspect, the method further includes: sending, via the network device, to the terminal device a random access response for the correctly received random access preamble in the K random access preambles within a preset time window.

In combination with the second aspect and its implementation manners mentioned above, in another implementation manner of the second aspect, the method further includes: performing, via the network device, information transmission with the terminal device according to a transmitting beam corresponding to the correctly received random access preamble.

According to a third aspect, there is provided a terminal device for performing the method according to the above first aspect or any of the possible implementation manners of the first aspect. In particular, the terminal device includes functional modules for performing the method according to the above first aspect or any possible implementation manners of the first aspect.

According to a fourth aspect, there is provided a network device for performing the method according to the above second aspect or any of the possible implementation manners of the second aspect. In particular, the network device includes functional modules for performing the method according to the above second aspect or any of the possible implementations of the second aspect.

According to a fifth aspect, there is provided a terminal device, including a processor, a memory, and a transceiver. The processor, the memory, and the transceiver communicate with each other through internal connection paths, and transmit control and/or data signals, such that the terminal device performs the method according to the above first aspect or any of the possible implementation manners of the first aspect.

According to a sixth aspect, there is provided a network device, including: a processor, a memory, and a transceiver. The processor, the memory, and the transceiver communicate with each other through internal connection paths, and transmit control and/or data signals, such that the network device performs the method according to the above second aspect or any of the possible implementation manners of the second aspect.

According to a seventh aspect, there is provided a computer readable medium for storing a computer program, the computer program including instructions for performing the first aspect or any of the possible implementation manners of the first aspect.

According to an eighth aspect, there is provided a computer readable medium for storing a computer program, the computer program including instructions for performing the above second aspect or any of the possible implementation manners of the second aspect.

DETAILED DESCRIPTION

Hereinafter, the technical solutions in the embodiments of the present application will be clearly and completely described with reference to the accompanying drawings in the embodiments of the present application.

It should be understood that the technical solutions of the embodiments of the present application may be applied to various communication systems, for example, Global System of Mobile communication (referred to as "GSM") system, Code Division Multiple Access (referred to as "CDMA") system, Wideband Code Division Multiple Access (referred to as "WCDMA") system, General Packet Radio Service (referred to as "GPRS"), Long Term Evolution (Referred to as "LTE") system, LTE Frequency Division Duplex (referred to as "FDD") system, LTE Time Division Duplex (referred to as "TDD"), Universal Mobile Telecommunication System (referred to as "UMTS") or Worldwide Interoperability for Microwave Access (referred to as "WiMAX") communication system, 5G system, or New Radio (referred to as "NR") system.

In the embodiments of the present application, the terminal device may include, but is not limited to, a mobile station (Mobile Station, MS), a mobile terminal (Mobile Terminal), a mobile telephone (Mobile Telephone), a user equipment (User Equipment, UE), a handset, a portable equipment, a vehicle, etc. The terminal device may communicate with one or more core networks via a Radio Access Network (RAN), for example, the terminal device may be a mobile telephone (or known as a "cellular" telephone), a computer with a wireless communication capability, etc., and the terminal device may also be a portable, pocket-sized, handheld, computer-integrated or in-vehicle mobile device.

The network device involved in the embodiments of the present application is an apparatus deployed in a radio access network to provide a wireless communication function for the terminal device. The network device may be a base station, and the base station may include various forms of macro base stations, micro base stations, relay stations, access points, and the like. In systems with different wireless access technologies, the name of device with base station functionality may vary. For example, in an LTE network, it is called an Evolved NodeB ("eNB" or "eNodeB"); and in a 3rd Generation (3G) network, it is called a Node B.

It should be noted that the random access preamble in the embodiments of the present application may also be referred to as a "preamble (Preamble)" or "random access preamble" or "random access preamble sequence".

Figure 1:
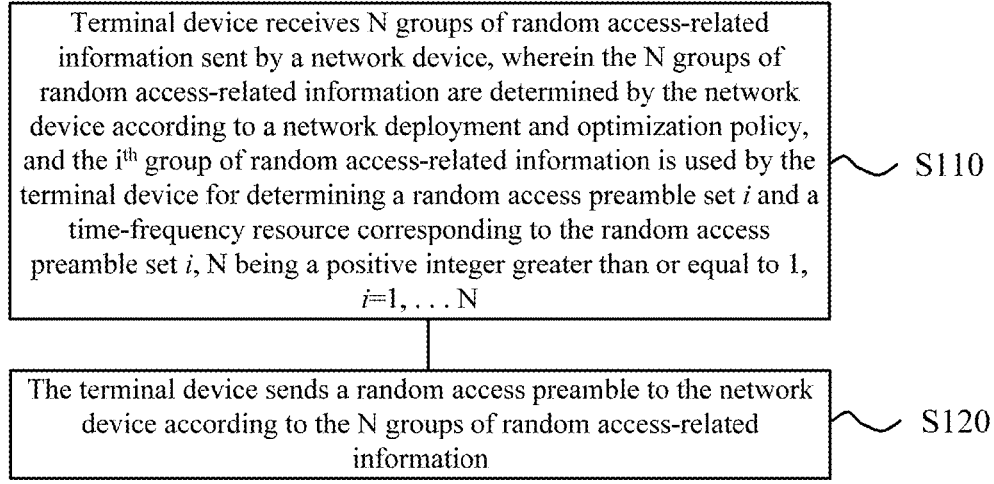
FIG. 1 is a schematic flowchart of a method for random access according to an embodiment of the present application.

FIG. 1 illustrates a method for random access in accordance with an embodiment of the present application. As shown in FIG. 1, the method 100 includes the following steps.

In S110, a terminal device receives N groups of random access-related information sent by a network device, wherein the N groups of random access-related information are determined by the network device according to a network deployment and optimization policy, and the $i^{th}$ group random access is used by the terminal device to determine a random access preamble set i and a time-frequency resource corresponding to the random access preamble set i, N being a positive integer greater than or equal to 1, i=1, . . . N.

In S120, the terminal device sends a random access preamble to the network device according to the N groups of random access-related information.

In the embodiments of the present application, the network device determines, according to the network deployment and optimization policy, the number of groups of random access-related information that needs to be sent to the terminal device is N, and generates N groups of random access-related information, and then sends the N groups of random access-related information to the terminal device.

For example, the network device determines that it is acceptable that the random access procedure occupies many system resources according to the network deployment and optimization policy, and then the network device may send at least two groups of random access-related information to the terminal device. On the other hand, if the network device does not want the random access procedure to occupy too much system resources, the network device may only send one group of random access-related information to the terminal device. Alternatively, if the network device determines that a delay of the random access procedure needs to be less than a preset delay according to the network deployment and optimization policy, the network device may send multiple groups of random access-related information to the terminal device to reduce the delay of the random access procedure. On the contrary, the network device may send only one group of random access-related information to the terminal device.

In the embodiments of the present application, optionally, the terminal device receives a broadcast message sent by the network device, the broadcast message carrying the above-mentioned N groups of random access-related information; or the terminal device receives a system message sent by the network device, the system message carrying the above-mentioned N groups of random access-related information; or, the terminal device receives a dedicated signaling sent by the network device, the dedicated signaling carrying the above-mentioned N groups of random access-related information.

It can be understood that one random access preamble set includes a plurality of random access preambles. The N random access preamble sets may be divided into multiple groups, and the random access preamble sets in each group may be further divided into multiple types of preambles. Or, the N random access preamble sets may be divided into multiple types of preambles, and the random access preamble sets included in each type of preambles may be divided into multiple groups.

For example, assuming that a configuration message includes six groups of random access-related information, then the terminal device determines six random access preamble sets according to the six groups of random access-related information. The six random access preamble sets are divided into three groups according to a size of a corresponding message (Msg) 3, wherein the random access preamble set 1 and the random access preamble set 3 belong to the group 1, the random access preamble set 2 and the random access preamble set 4 belongs to the group 2, and the random access preamble set 5 and the random access preamble 6 belong to the group 3. The random access preamble sets in the group 1 are classified into two types of preamble according to the size of the corresponding path loss: the random access preamble set 1 belongs to the preamble of class A, and the random access preamble set 2 belongs to the preamble of class B. The random access preamble sets in the group 2 are classified into two types of preamble according to the corresponding path loss size: the random access preamble set 3 belongs to the preamble of class B, and the random access preamble in the random access preamble set 4 belongs to the preamble of class A. The random access preamble sets in the group 3 are classified into two types of preamble according to the corresponding path loss size: the random access preamble set 5 belongs to the preamble of class B, and the random access preamble set 6 belongs to the preamble of class A.

Based on this, it is assumed that the terminal device can send a random access preamble to the network device through two beams (Beam), then it is determined that the random access preambles in the group 1 and the group 2 need to be sent to the network device according to the size of the Msg 3 to be transmitted, and it is determined that the preamble of class A needs to be sent according to the size of the path loss. Therefore, the terminal device selects one random access preamble from the random access preamble set 1, and selects one random access preamble from the random access preamble set 4, and then sends the selected two random access preambles through different Beams to the network device.

Alternatively, it is assumed that the configuration message includes six groups of random access-related information, and the terminal device determines six random access preamble sets according to the six groups of random access-related information. The six random access preamble sets are classified into two types of preambles according to the size of the corresponding Msg3, wherein the random access preamble set 1, the random access preamble set 3, and the random access preamble set 5 belong to the preamble of class A, and the random access preamble set 2, the random access preamble set 4, and the random access preamble set 6 belong to the preamble of class B. The random access preamble sets included in the preamble of class A are divided into two groups according to the size of the corresponding path loss: the random access preamble set 1 and the random access preamble set 3 belong to the group 1, and the random access preamble set 5 belongs to the group 2. The random access preamble sets included in the preamble of class B are divided into two groups according to the corresponding path loss size: the random access preamble set 2 belongs to the group 1, and the random access preamble 4 and the random access preamble 6 belong to the group 2.

Based on this, it is assumed that the terminal device can send a random access preamble to the network device through the two Beams, and according to the size of the Msg 3 that needs to be sent, it is determined that the preamble of class A needs to be sent to the network device, and it is determined that the random access preamble in the group 1 needs to be sent according to the size of the path loss. Therefore, the terminal device selects one random access preamble from each of the random access preamble set 1 and the random access preamble set 3, and then sends the selected two random access preambles to the network device through different Beams.

Alternatively, in the process of performing random access, the terminal device selects K groups of random access-related information from the above N groups of random access-related information according to its own implementation or other information, K being a positive integer greater than or equal to 2, determines K random access preamble sets according to the K groups of random access-related information, and selects one random access preamble from each of the K random access preamble sets. The terminal device determines the time-frequency resources for sending the K random access preambles according to the K groups of random access-related information, and sends the K random access preambles to the network device on the determined time-frequency resources, wherein transmitting beams corresponding to at least two of the K random access preambles are different.

For example, the terminal device determines four random access preambles according to four groups of random access-related information, i.e., random access preamble 1-random access preamble 4. However, due to the limitation of the number of antennas or the implementation method/policy limitation of the device, the terminal device only uses two Beams (Beam1 and Beam2) to send the random access preambles to the network device. Then, the terminal device may first send the random access preamble 1 through Beam1, send the random access preamble 2 through Beam2, then send the random access preamble 3 through Beam1, and send the random access preamble 4 through Beam2. If the terminal device may send the random access preamble to the network device through four Beams at a time, the terminal device separately sends the random access preamble 1-random access preamble 4 through the Beam1-Beam4.

In the foregoing embodiment, optionally, each group of random access-related information includes preamble information and resource indication information, the preamble information is used to indicate a parameter for determining a random access preamble set, and the resource indication information is used to indicate a time-frequency resource corresponding to the random access preamble.

Alternatively, the first group of random access-related information includes the preamble information 1 and the resource indication information 1. The $j^{th}$ group of random access-related information includes offset information j, and the offset information j is used by the terminal device to determine the preamble information j and the resource indication information j according to the offset information j, j=2, . . . N.

Optionally, as an example, the foregoing offset information j is an offset value of some parameters in the $j^{th}$ group of random access-related information with respect to these parameters in the first group of random access-related information, or the offset information j is an offset value of some parameters in the $j^{th}$ group of random access-related information with respect to the $(j-1)^{th}$ group of random access-related information.

In the embodiments of the present application, optionally, the foregoing offset information includes at least one of the following information: root sequence number offset information, frequency domain resource offset information, and time domain resource offset information.

It can be understood that the first group of random access-related information or the $(j-1)^{th}$ group of random access-related information in the foregoing embodiment may be referred to as "reference group random access-related information". If a corresponding value of some information in the reference group random access-related information plus a value corresponding to the offset information has exceeded a maximum value specified by the communication system, a mod operation may be performed to ensure that a sum of the two is within a range specified by the system.

For example, it is assumed that the time domain resource corresponding to the reference group random access-related information is located on a subframe 1, and the value corresponding to the offset information 6 is 9, because the sum of 1 and 9 is 10, and the maximum value of the subframe number in the communication system is 9 (numbered from 0), the mod operation may be performed: 10 mod 10=0. Therefore, it may be considered that the time domain resource corresponding to the sixth random access-related information is located on the subframe 0.

Figure 2:
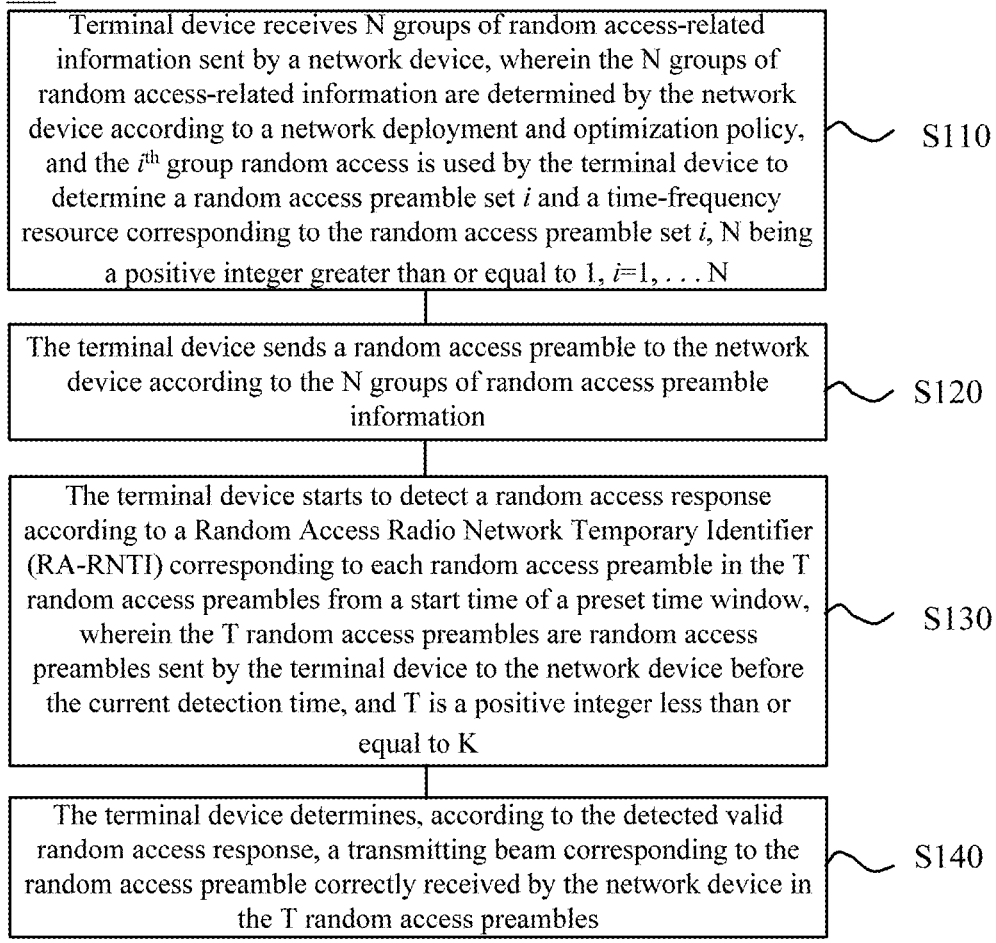
FIG. 2 is another schematic flowchart of a method for random access according to an embodiment of the present application.

In the embodiments of the present application, optionally, as shown in FIG. 2, the method 100 further includes the following steps.

In S130, the terminal device starts to detect a random access response according to a Random Access Radio Network Temporary Identifier (RA-RNTI) corresponding to each random access preamble in the T random access preambles from a start time of a preset time window, wherein the T random access preambles are random access preambles sent by the terminal device to the network device before the current detection time, and T is a positive integer less than or equal to K.

In S140, the terminal device determines, according to the detected valid random access response, a transmitting beam corresponding to the random access preamble correctly received by the network device in the T random access preambles.

It can be understood that each random access preamble may correspond to one Random Access Radio Network Temporary Identity (RA-RNTI), and the terminal device detects the Random Access Response (RAR) sent by the network device according to T RA-RNTIs within a specified time window. The RAR corresponding to the above T RA-RNTIs in the RARs detected by the terminal device is called a valid random access response.

Figure 3:
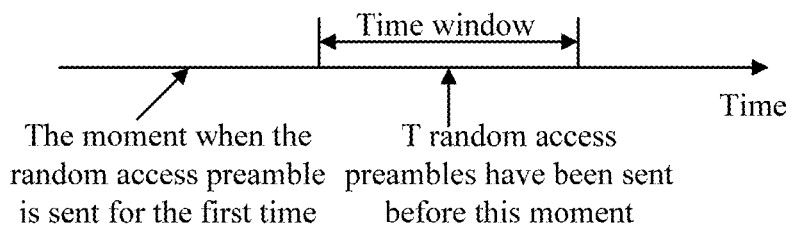
FIG. 3 is still another schematic diagram of a method for random access according to an embodiment of the present application.

As shown in FIG. 3, after sending the random access preamble for the first time, the terminal device may perform RAR detection according to the specified time window, and may continue to send the random access preamble during the detection. And the terminal device may stop detecting when a valid RAR corresponding to any one of the T RA-RNTIs is detected, or the terminal device continues to detect until the prescribed time window ends.

Further, when the terminal device determines that no valid random access response is detected within the preset time window, the terminal device resends the random access preamble to the network device after a specified time.

In the above embodiment, the terminal device may determine the random access preamble(s) correctly received by the network device according to the received valid random access response, further determine the Beam(s) for transmitting the random access preamble(s) correctly received by the network device, and perform information transmission with the network device according to the Beam(s). For example, Msg3 and uplink data are sent to the network device through the Beam(s).

That is, in the embodiments of the present application, the terminal device may determine multiple random access preambles sent to the network device according to the random access-related information configured by the network device. Then, the multiple random access preambles are sent to the network device through different Beams, and the RAR sent by the network device is detected. According to the detected valid RAR, it can be known which random access preamble is correctly received by the network device, thereby determining the transmitting Beam corresponding to the random access preamble correctly received by the network device, and then communicating with the network device through these Beams. Through the method of the present application, the terminal device preliminarily determines the corresponding uplink transmitting Beam (UL Tx Beam) in the random access process, which reduces the blind transmission of the terminal device using different beams, and reduces the access delay.

In the above embodiment, the terminal device may learn the specified time window from the system broadcast message (SIB2).

The method for random access according to the embodiments of the present application has been described in detail from the terminal device side in combination with FIG. 1 to FIG. 3. The following describes the method for random access according to the embodiments of the present application from the network device side in combination with FIG. 4 and FIG. 5. It should be understood that the interaction between the network device and the terminal device described from the network device side is the same as that described from the terminal device side. To avoid repetition, the related description is omitted as appropriate.

Figure 4:
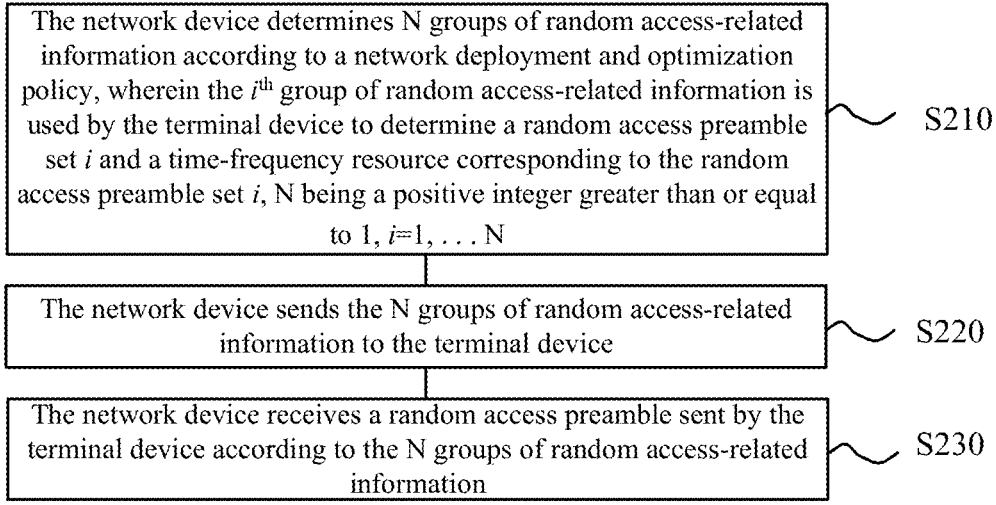
FIG. 4 is a schematic flowchart of a method for random access according to another embodiment of the present application.

FIG. 4 is a method for random access according to another embodiment of the present application. As shown in FIG. 4, the method 200 includes the following steps.

In S210, the network device determines N groups of random access-related information according to a network deployment and optimization policy, wherein the $i^{th}$ group of random access-related information is used by the terminal device to determine a random access preamble set i and a time-frequency resource corresponding to the random access preamble set i, N being a positive integer greater than or equal to 1, i=1, . . . N.

In S220, the network device sends the N groups of random access-related information to the terminal device.

In S230, the network device receives a random access preamble sent by the terminal device according to the N groups of random access-related information.

Therefore, according to the method for random access in the embodiments of the present application, the network device sends the random access-related information to the terminal device according to the network deployment and optimization policy, so that the terminal device sends the random access preamble to the network device according to the received random access-related information. The method can be applied to a multi-beam communication system.

In the embodiments of the present application, optionally, the S220 specifically includes: the network device receives K random access preambles sent by the terminal device on the time-frequency resources corresponding to the K random access preambles, wherein transmitting beams corresponding to at least two random access preambles of the K random access preambles are different.

The K random access preambles are determined by the terminal device according to the K random access preamble sets, the random access preamble sets to which the K random access preambles belong are different, and the K random access preamble sets and the time-frequency resources corresponding to the K random access preambles are determined by the terminal device according to the K groups of random access-related information in the N groups of random access-related information, wherein K is a positive integer greater than or equal to 2.

In the embodiments of the present application, optionally, the $i^{th}$ random access-related information i includes preamble information i and resource indication information i, the preamble information i is used to indicate a parameter used to determine a random access preamble set i, and the resource indication information i is used to indicate a time-frequency resource corresponding to the random access preamble set i.

In the embodiments of the present application, optionally, the first group of random access-related information includes preamble information 1 and resource indication information 1, and the $j^{th}$ group of random access-related information includes offset information j, and the offset information j is used by the terminal device to determine preamble information j and resource indication information j according to the offset information j, j=2, . . . N.

The preamble information 1 is used to indicate a parameter for determining a random access preamble set 1, the resource indication information 1 is used to indicate a time-frequency resource corresponding to the random access preamble set 1, the preamble information j is used to indicate a parameter for determining a random access preamble set j, and the resource indication information j is used to indicate a time-frequency resource corresponding to the random access preamble set j.

In the embodiments of the present application, optionally, the offset information j includes at least one of the following information: root sequence number offset information, frequency domain resource offset information, and time domain resource offset information.

Figure 5:
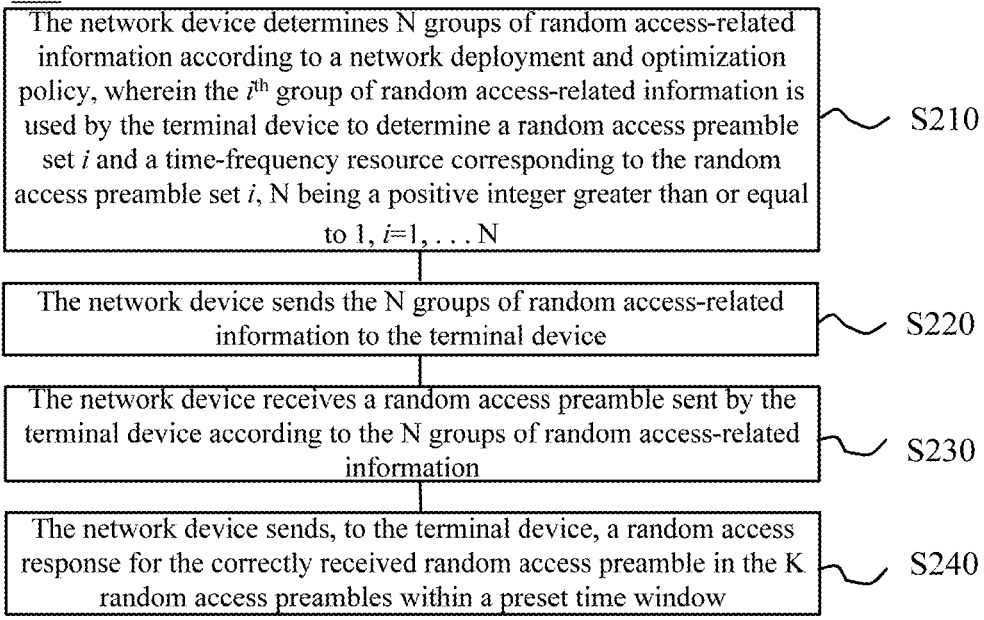
FIG. 5 is another schematic diagram of a method for random access according to another embodiment of the present application.

In the embodiments of the present application, optionally, as shown in FIG. 5, the method 200 further includes the following steps.

In S240, the network device sends, to the terminal device, a random access response for the correctly received random access preamble in the K random access preambles within a preset time window.

In the embodiments of the present application, optionally, the method 200 further includes: the network device performing information transmission with the terminal device according to the transmitting beam corresponding to the correctly received random access preamble.

Figure 6:
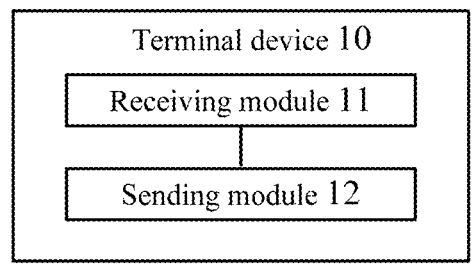
FIG. 6 is a schematic block diagram of a terminal device according to an embodiment of the present application.

The method for random access according to the embodiments of the present application has been described in detail above with reference to FIG. 1 to FIG. 5. The terminal device according to the embodiments of the present application will be described in detail below with reference to FIG. 6. As shown in FIG. 6, the terminal device 10 includes: a receiving module 11 and a sending module 12.

The receiving module 11 is configured to receive N groups of random access-related information sent by the network device, wherein the N groups of random access-related information are determined by the network device according to a network deployment and optimization policy, and the $i^{th}$ group random access-related information is used by the terminal device to determine a random access preamble set i and a time-frequency resource corresponding to the random access preamble set i, N being a positive integer greater than or equal to 1, i=1, . . . N.

The sending module 12 is configured to send a random access preamble to the network device according to the N groups of random access-related information.

Therefore, the terminal device according to the embodiments of the present application receives the random access-related information determined by the network device according to the network deployment and optimization policy, and sends the random access preamble to the network device according to the received random access-related information, which is applicable to the multi-beam communication system.

In the embodiments of the present application, optionally, the sending module 12 is specifically configured to: determine, according to K groups of random access-related information in the N groups of random access-related information, K random access preamble sets, K being a positive integer greater than or equal to 2;

determine K random access preambles according to the K random access preamble sets, the random access preambles to which the K random access preambles belong being different;

determine, according to the K groups of random access-related information, time-frequency resources corresponding to the K random access preambles; and send the K random access preambles to the network device on the time-frequency resources corresponding to the K random access preambles, transmitting beams corresponding to at least two of the K random access preambles being different.

In the embodiments of the present application, optionally, the $i^{th}$ group of the random access preamble-related information includes preamble information i and resource indication information i, wherein the preamble information i is used to indicate a parameter used to determine the random access preamble set i, and the resource indication information i is used to indicate a time-frequency resource corresponding to the random access preamble set i.

In the embodiments of the present application, optionally, the first group of random access-related information includes preamble information 1 and resource indication information 1, the $j^{th}$ group of random access-related information includes offset information j, and the offset information j is used by the terminal device to determine the preamble information j and the resource indication information j according to the offset information j, j=2, . . . N.

The preamble information 1 is used to indicate a parameter for determining a random access preamble set 1, the resource indication information 1 is used to indicate a time-frequency resource corresponding to the random access preamble set 1, the preamble information j is used to indicate a parameter for determining a random access preamble set j, and the resource indication information j is used to indicate a time-frequency resource corresponding to the random access preamble set j.

In the embodiments of the present application, optionally, the offset information j includes at least one of the following information: root sequence number offset information, frequency domain resource offset information, and time domain resource offset information.

In the embodiments of the present application, the receiving module 11 is further configured to: start, according to a start time of the preset time window, to detect a random access response according to a Random Access Radio Network Temporary Identity (RA-RNTI) corresponding to each random access preamble in the T random access preambles, wherein the T random access preambles are random access preambles sent by the sending module to the network device before the current detection time, and T is a positive integer less than or equal to K; and determine, according to the detected valid random access response, a transmitting beam corresponding to the random access preamble correctly received by the network device in the T random access preambles.

In the embodiments of the present application, the receiving module 11 is further configured to: stop detecting when a preset number of valid random access responses are detected before an end time of the preset time window.

In the embodiments of the present application, optionally, the receiving module 11 is further configured to: stop detecting at an end time of the preset time window.

The sending module 12 is further configured to: when the receiving module 11 determines that no valid random access response is detected in the preset time window, resend the random access preamble to the network device according to the N groups of random access-related information.

In the embodiments of the present application, optionally, the sending module 12 is further configured to: perform information transmission with the network device according to the transmitting beam corresponding to the random access preamble correctly received by the network device.

The terminal device according to the embodiments of the present application may refer to the process of the method 100 for random access corresponding to the embodiments of the present application, and each unit/module in the terminal device and the foregoing other operations and/or functions are respectively implemented in order to realize the corresponding procedures in the method 100, which will not be repeated here for brevity.

Figure 7:
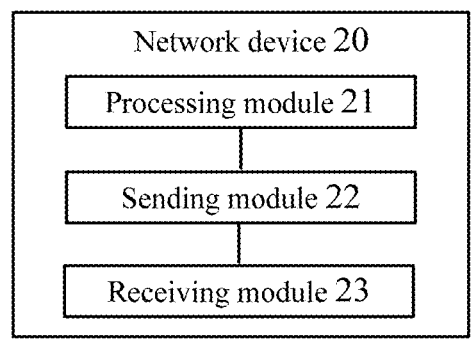
FIG. 7 is a schematic block diagram of a network device according to an embodiment of the present application.

FIG. 7 shows a network device according to an embodiment of the present application. As shown in FIG. 7, the network device 20 includes: a processing module 21, a sending module 22, and a receiving module 23.

The processing module 21 is configured to determine N groups of random access-related information according to the network deployment and optimization policy, where the $i^{th}$ group random access-related information is used by the terminal device to determine a random access preamble set i and a time-frequency resource corresponding to the random access preamble set i, N being a positive integer greater than or equal to 1, i=1, . . . N.

The sending module 22 is configured to send the N groups of random access-related information to the terminal device.

The receiving module 23 is configured to receive a random access preamble sent by the terminal device according to the N groups of random access-related information.

Therefore, the network device according to the embodiments of the present application sends the random access-related information to the terminal device according to the network deployment and optimization policy, so that the terminal device sends the random access preamble to the network device according to the received random access-related information, which can be applied to the multi-beam communication system.

In the embodiments of the present application, optionally, the receiving module 23 is specifically configured to: receive K random access preambles sent by the terminal device on time-frequency resources corresponding to the K random access preambles, wherein transmitting beams corresponding to at least two random access preambles of the K random access preambles are different from each other.

The K random access preambles are determined by the terminal device according to the K random access preamble sets, the random access preambles to which the K random access preambles belong are different, the K random access preambles and the time-frequency resources corresponding to the K random access preamble sets are determined by the terminal device according to the K groups of random access-related information in the N groups of random access-related information, where K is a positive integer greater than or equal to 2.

In the embodiments of the present application, optionally, the $i^{th}$ random access-related information i includes preamble information i and resource indication information i, where the preamble information i is used to indicate a parameter used to determine a random access preamble set i, and the resource indication information i is used to indicate a time-frequency resource corresponding to the random access preamble set i.

In the embodiments of the present application, optionally, the first group of random access-related information includes preamble information 1 and resource indication information 1, the $j^{th}$ group of random access-related information includes offset information j, and the offset information j is used by the terminal device to determine preamble information j and resource indication information j according to the offset information j, j=2, . . . N.

The preamble information 1 is used to indicate a parameter for determining a random access preamble set 1, the resource indication information 1 is used to indicate a time-frequency resource corresponding to the random access preamble set 1, the preamble information is used to indicate a parameter for determining a random access preamble set j, and the resource indication information j is used to indicate a time-frequency resource corresponding to the random access preamble set j.

In the embodiments of the present application, optionally, the offset information j includes at least one of the following information: root sequence number offset information, frequency domain resource offset information, and time domain resource offset information.

In the embodiments of the present application, the sending module 22 is further configured to: send, to the terminal device, a random access response for the correctly received random access preamble in the K random access preambles in a preset time window.

In the embodiments of the present application, the sending module 22 is further configured to: perform information transmission with the terminal device according to the transmitting beam corresponding to the correctly received random access preamble.

The network device according to the embodiments of the present application may refer to the process of the method 200 for random access corresponding to the embodiments of the present application, and each unit/module in the network device and the foregoing other operations and/or functions are respectively implemented in order to realize the corresponding flow in the method 200, which will not be repeated here for brevity.

Figure 8:
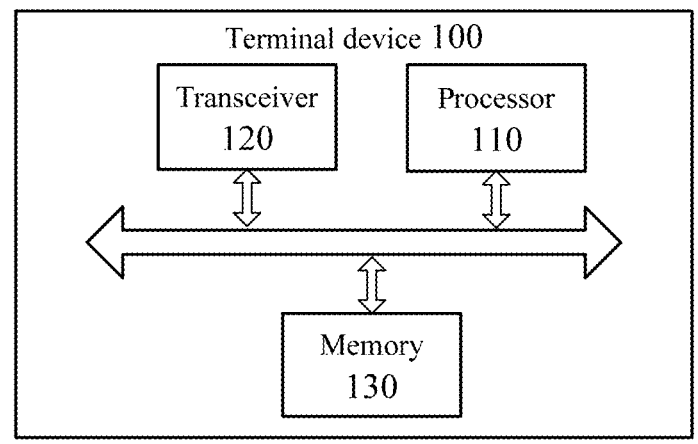
FIG. 8 is a schematic block diagram of a terminal device according to another embodiment of the present application.

FIG. 8 shows a terminal device according to another embodiment of the present application. As shown in FIG. 8, the terminal device 100 includes a processor 110 and a transceiver 120. The processor 110 is connected to the transceiver 120. Optionally, the network device 100 further includes a memory 130. The memory 130 is connected to the processor 110. The processor 110, the memory 130, and the transceiver 120 may communicate with each other through an internal connection path. The transceiver 120 is configured to receive N groups of random access-related information sent by the network device, where the N groups of random access-related information are determined by the network device according to a network deployment and optimization policy, and the $i^{th}$ group of random access-related information is used by the terminal device to determine a random access preamble set i and a time-frequency resource corresponding to the random access preamble set i, N being a positive integer greater than or equal to 1, i=1, . . . N; and send, according to the N groups of random access-related information, a random access preamble to the network device.

Therefore, the terminal device according to the embodiments of the present application receives the random access-related information determined by the network device according to the network deployment and optimization policy, and sends the random access preamble to the network device according to the received random access-related information, which is applicable to the multi-beam communication system.

The terminal device 100 according to the embodiments of the present application may refer to the terminal device 10 corresponding to the embodiments of the present application, and the respective units/modules in the terminal device and the other operations and/or functions described above are respectively implemented to realize the corresponding processes in the method 100. For the sake of brevity, it will not be repeated here.

Figure 9:
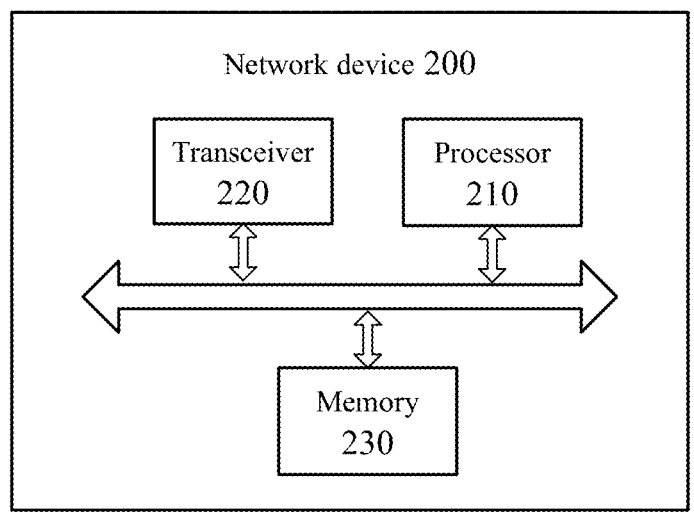
FIG. 9 is a schematic block diagram of a network device according to another embodiment of the present application.

FIG. 9 is a schematic block diagram of a network device according to another embodiment of the present application.

As shown in FIG. 9, the network device 200 includes: a processor 210 and a transceiver 220. The processor 210 and the transceiver 220 are connected. Optionally, the terminal device 200 further includes a memory 230, and the memory 230 is connected to the processor 210. The processor 210, the memory 230, and the transceiver 220 may communicate with each other through an internal connection path. The processor 210 is configured to determine N groups of random access-related information according to the network deployment and optimization policy, where the $i^{th}$ group of random access-related information is used by the terminal device to determine a random access preamble set i and a time-frequency resource corresponding to the random access preamble set i, N being a positive integer greater than or equal to 1, i=1, . . . N; the transceiver 220 is configured to send the N groups of random access to the terminal device; and the transceiver 220 is further configured to receive a random access preamble sent by the terminal device according to the N groups of random access-related information.

Therefore, the network device according to the embodiments of the present application sends the random access-related information to the terminal device according to the network deployment and the optimization policy, so that the terminal device sends the random access preamble to the network device according to the received random access-related information, which can be applied to the multi-beam communication system.

The network device 200 according to the embodiments of the present application may refer to the network device 20 corresponding to the embodiments of the present application, and the respective units/modules in the network device and the foregoing other operations and/or functions respectively implement the corresponding processes in the method 200. For the sake of brevity, it will not be repeated here.

It should be understood that, in the embodiments of the present application, the processor may be a Central Processing Unit (CPU), and the processor may also be other general-purpose processors, digital signal processors (DSPs), application specific integrated circuits (ASIC), filed programmable gate array (FPGA) or other programmable logic devices, discrete gates or transistor logic devices, discrete hardware components, and the like. The general-purpose processor may be a microprocessor, or the processor may also be any conventional processor or the like.

The memory may include read only memory and random access memory, and provides instructions and data to the processor. A portion of the memory may also include a non-volatile random access memory. For example, the memory may also store information of the device type.

In the implementation process, each step of the above method may be completed by an integrated logic circuit of hardware in the processor or an instruction in a form of software. The steps of the method disclosed in the embodiments of the present application may be directly implemented as a hardware processor, or may be performed by a combination of hardware and software modules in the processor. The software module may be located in a conventional storage medium such as a random access memory, a flash memory, a read only memory, a programmable read only memory or an electrically erasable programmable memory, a registers, and the like. The storage medium is located in the memory, and the processor reads information in the memory and combines the hardware to complete the steps of the above method. To avoid repetition, it will not be described in detail here.

Those of ordinary skill in the art will appreciate that the units and algorithm steps of individual examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods for implementing the described functions for each particular application, but such implementation should not be considered to be beyond the scope of the present application.

A person skilled in the art can clearly understand that for convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods may be implemented in other manners. For example, the device embodiments described above are merely illustrative. For example, the division of the unit is only a logical function division. In actual implementation, there may be other division manner, for example, multiple units or components may be combined or may be integrated into another system, or some features may be ignored or not executed. In addition, the coupling or direct coupling or communication connection shown or discussed herein may be an indirect coupling or communication connection through some interfaces, devices or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiments.

In addition, each functional unit in each embodiment of the present application may be integrated into one processing unit, or each unit may exist physically and separately, or two or more units may be integrated into one unit.

The functions may be stored in a computer readable storage medium if implemented in the form of a software functional unit and sold or used as a standalone product. In view of this, the technical solution of the present disclosure, or the part of the solutions contributing to the prior art or the part of the technical solutions, may be embodied in the form of a software product, and the computer software product is stored in a storage medium and includes instructions for causing a computer device (which may be a personal computer, server, or network device, etc.) to perform all or part of the steps of the methods described in various embodiments of the present disclosure. The foregoing storage medium may include various mediums for storing program codes, such as a USB drive, a mobile hard disk, a Read-Only Memory (ROM), a Random Access Memory (RAM), a magnetic disk, or an optical disk.

The above is only the specific embodiments of the present disclosure, and the protection scope of the present disclosure is not limited thereto. Any of changes or substitutions that could be thought of by the ordinary skill in the art within the technical scope of the present disclosure should be covered by the protection scope of the present disclosure. Therefore, the protection scope of the present disclosure should be determined by the protection scope of the appended claims.

What is claimed is:

1. A method for random access, comprising:

receiving, via a terminal device, N groups of random access-related information sent by a network device, wherein the N groups of random access-related information are determined by the network device according to a network deployment and optimization policy, and a $i^{th}$ group of random access-related information is used by the terminal device for determining a random access preamble set i corresponding to the $i^{th}$ group and a time-frequency resource corresponding to the random access preamble set i, N being a positive integer greater than or equal to 1, i=1, . . . N; and sending, via the terminal device, a random access preamble to the network device according to the N groups of random access-related information;

wherein the sending, via the terminal device, the random access preamble to the network device according to the N groups of random access-related information, comprises:

determining, via the terminal device, K random access preamble sets according to K groups of random access-related information in the N groups of random access-related information, wherein K is a positive integer greater than or equal to 2;

determining, via the terminal device, K random access preambles according to the K random access preamble sets, wherein the random access preamble sets to which the K random access preambles belong are different from each other;

determining, via the terminal device, time-frequency resources corresponding to the K random access preambles according to the K groups of random access-related information; and sending, via the terminal device, the K random access preambles to the network device on the time-frequency resources corresponding to the K random access preambles, wherein transmitting beams corresponding to at least two of the K random access preambles are different.

2. The method according to claim 1, wherein the $i^{th}$ group of random access-related information comprises: preamble information i and resource indication information i, the preamble information i is used to indicate a parameter for determining the random access preamble set i, and the resource indication information i is used to indicate the time-frequency resource corresponding to the random access preamble set i.

3. The method according to claim 1, wherein a first group of random access-related information comprises:

preamble information 1 corresponding to the first group and resource indication information 1 corresponding to the first group, a $j^{th}$ group of random access-related information comprises: offset information j corresponding to the $j^{th}$ group, and the offset information j is used by the terminal device for determining preamble information j corresponding to the $j^{th}$ group and resource indication information j corresponding to the $j^{th}$ group according to the offset information j, j=2, . . . N;

wherein the preamble information 1 is used to indicate a parameter for determining a random access preamble set 1 corresponding to the first group, the resource indication information 1 is used to indicate a time-frequency resource corresponding to the random access preamble set 1, the preamble information j is used to indicate a parameter for determining a random access preamble set j, and the resource indication information j is used to indicate a time-frequency resource corresponding to the random access preamble set j.

4. The method according to claim 3, wherein the offset information j comprises at least one of following information: root sequence number offset information, frequency domain resource offset information and time domain resource offset information.

5. The method according to claim 1, further comprising:
starting to detect, via the terminal device, a random access response according to a Random Access Radio Network Temporary Identifier (RA-RNTI) corresponding to each random access preamble in T random access preambles at a start time of a preset time window, wherein the T random access preambles are random access preambles sent by the terminal device to the network device before a current detection time, and the T is a positive integer less than or equal to K; and
determining, via the terminal device, a transmitting beam corresponding to the random access preamble which is correctly received by the network device in the T random access preambles, according to the detected valid random access response.

6. The method according to claim 5, further comprising:
when the terminal device detects a preset number of the valid random access responses before an end time of the preset time window, stopping, via the terminal device, the detection.

7. The method according to claim 5, further comprising:
stopping, via the terminal device, the detection at an end time of the preset time window; and
when the terminal device determines that no valid random access response is detected within the preset time window, resending, via the terminal device, the random access preamble to the network device according to the N groups of random access-related information.

8. The method according claim 5, further comprising:
performing, via the terminal device, information transmission with the network device according to the transmitting beam corresponding to the random access preamble which is correctly received by the network device.

9. A method for random access, comprising:
determining, via a network device, N groups of random access-related information according to a network deployment and optimization policy, wherein a $i^{th}$ group of random access-related information is used by a terminal device to determine a random access preamble set i corresponding to the $i^{th}$ group and a time-frequency resource corresponding to the random access preamble set i, N being a positive integer greater than or equal to 1, i=1, . . . N;
sending, via the network device, the N groups of random access-related information to the terminal device; and
receiving, via the network device, a random access preamble sent by the terminal device according to the N groups of random access-related information;
wherein the receiving, via the network device, the random access preamble sent by the terminal device according to the N groups of random access-related information, comprises:
receiving, via the network device, K random access preambles that are sent by the terminal device on the time-frequency resources corresponding to the K random access preambles, wherein transmitting beams corresponding to at least two of the K random access preambles are different;

wherein the K random access preambles are determined by the terminal device according to K random access preamble sets, the random access preamble sets to which the K random access preambles belong are different from each other, and the time-frequency resources corresponding to the K random access preamble sets and the K random access preambles are determined by the terminal device according to the K groups of random access-related information in the N groups of random access-related information, wherein K is a positive integer greater than or equal to 2.

10. The method according to claim 9, wherein the $i^{th}$ random access-related information i comprises preamble information i and resource indication information i, the preamble information i is used to indicate a parameter for determining a random access preamble set i, and the resource indication information i is used to indicate a time-frequency resource corresponding to the random access preamble set i.

11. The method according to claim 9, wherein a first group of random access-related information comprises:
preamble information 1 corresponding to the first group and resource indication information 1 corresponding to the first group, a $j^{th}$ group of random access-related information comprises offset information j corresponding to the $j^{th}$ group, and the offset information j is used by the terminal device to determine preamble information j corresponding to the $j^{th}$ group and resource indication information j corresponding to the $j^{th}$ group according to the offset information j, j=2, . . . N;
wherein the preamble information 1 is used to indicate a parameter for determining a random access preamble set 1 corresponding to the first group, the resource indication information 1 is used to indicate a time-frequency resource corresponding to the random access preamble set 1, the preamble information j is used to indicate a parameter for determining a random access preamble set j, and the resource indication information j is used to indicate a time-frequency resource corresponding to the random access preamble set j.

12. The method according to claim 11, wherein the offset information j comprises at least one of following information: root sequence number offset information, frequency domain resource offset information, and time domain resource offset information.

13. The method according to claim 9, further comprising:
sending, via the network device, to the terminal device a random access response for the correctly received random access preamble in the K random access preambles within a preset time window.

14. The method according to claim 13, further comprising:
performing, via the network device, information transmission with the terminal device according to transmitting beam corresponding to the correctly received random access preamble.

15. A terminal device, comprising:
a processor; and
a memory for storing instructions executable by the processor; wherein the processor is configured to:
receive N groups of random access-related information sent by a network device, wherein the N groups of random access-related information are determined by the network device according to a network deployment and optimization policy, and a $i^{th}$ group of random access-related information is used by the terminal device to determine a random access preamble set i corresponding to the $i^{th}$ group and a time-frequency resource corresponding to the random access preamble set i, N being a positive integer greater than or equal to 1, i=1, . . . N; and send a random access preamble to the network device according to the N groups of random access-related information;

wherein the processor is further configured to:

determine K random access preamble sets according to K groups of random access-related information in the N groups of random access-related information, wherein K is a positive integer greater than or equal to 2;

determine K random access preambles according to the K random access preamble sets, wherein the random access preamble sets to which the K random access preambles belong are different;

determine a time-frequency resource corresponding to the K random access preambles according to the K groups of random access-related information; and send the K random access preambles to the network device on the time-frequency resources corresponding to the K random access preambles, wherein transmitting beams corresponding to at least two of the K random access preambles are different.

16. The terminal device according to claim 15, wherein the $i^{th}$ groups of random access-related information comprises preamble information i and resource indication information i, the preamble information i is used to indicate a parameter for determining the random access preamble set i, and the resource indication information i is used to indicate a time-frequency resource corresponding to the random access preamble set i.

* * * * *